US006722618B1

(12) United States Patent
Wu

(10) Patent No.: US 6,722,618 B1
(45) Date of Patent: Apr. 20, 2004

(54) FOLDABLE SUPPORT FRAME FOR SUPPORTING CUTTING MACHINE

(75) Inventor: Shuming Wu, Nanjing (CN)

(73) Assignee: Chervon International Trading Co., Ltd. (CN)

(*) Notice: Subject to any disclaimer, the term of this patent is extended or adjusted under 35 U.S.C. 154(b) by 0 days.

(21) Appl. No.: 10/292,459

(22) Filed: Nov. 11, 2002

(51) Int. Cl.[7] .......... F16M 11/38

(52) U.S. Cl. .......... 248/166; 248/165; 248/150; 248/188.6; 248/463; 248/164; 248/431; 297/344.18; 297/56; 208/118; 208/116

(58) Field of Search .......... 248/166, 165, 248/434, 465, 460, 463, 150, 431, 188.6, 97, 125.8, 155.5, 164; 297/344.18, 56; 108/118, 116

(56) References Cited

U.S. PATENT DOCUMENTS 1,289,247 A * 12/1918 Pamperin .......... 108/119
2,845,317 A * 7/1958 Orman .......... 248/164
2,849,745 A * 9/1958 Madser .......... 15/268
2,957,736 A * 10/1960 Olander .......... 248/164
3,298,537 A * 1/1967 Di Marco .......... 211/200
3,374,047 A * 3/1968 Gatchell .......... 359/727
3,738,286 A * 6/1973 Hoffman .......... 108/147.22
3,893,648 A * 7/1975 Gilbert .......... 248/97
4,073,484 A * 2/1978 Beekenkamp .......... 269/329
4,705,247 A * 11/1987 Delmerico .......... 248/98
4,904,018 A * 2/1990 Young .......... 297/4
5,509,360 A 4/1996 Chiu .......... 108/119
5,542,359 A 8/1996 Poiries .......... 108/26
5,584,254 A 12/1996 Williams .......... 108/118
6,213,555 B1 * 4/2001 Sulpizio et al. .......... 297/377
6,272,961 B1 8/2001 Lee .......... 83/581
6,314,893 B1 * 11/2001 Lee .......... 108/119

* cited by examiner

*Primary Examiner*—Kimberly Wood
(74) *Attorney, Agent, or Firm*—Christopher J. Rourk; Akin Gump Strauss Hauer & Feld, LLP

(57) ABSTRACT

A foldable support frame for supporting a cutting machine comprises two opposing pairs of leg frames each of which comprises a pair of first crossed legs and second crossed legs that are pivotally connected together. Where the first and second crossed legs cross, two stopper means are positioned for supporting each pair of the first and second crossed legs and limiting the inclination of each of the first and second crossed legs. Each first and second crossed leg comprises an upper slide rod and a support leg, and each slide rod can slide within a respective support leg to adjust the total length of each first and second crossed leg. Thus, the foldable support frame can be easily folded or retracted in for storage and transport and unfolded or extended for supporting the cutting machine or other similar machines.

5 Claims, 6 Drawing Sheets

FOLDABLE SUPPORT FRAME FOR SUPPORTING CUTTING MACHINE

BACKGROUND OF THE INVENTION

The present invention relates to a support frame, and more particularly to a foldable support frame for supporting a cutting machine, which can be quickly and easily folded for storage and transport and unfolded for supporting the cutting machine.

U.S. Pat. No. 6,314,893 discloses a foldable table frame which comprises a tabletop frame and a foldable support frame which further comprises two opposing pairs of leg frames, each of which comprises a pair of first and second crossed legs that are pivotally connected together at the crossing point of the first and second crossed legs. The tabletop frame and the foldable support frame are connected together by a hinge bar. Table frames of this type are somewhat complex in structure and expensive in production cost. Meanwhile, such frames are not ideal for reducing storage and transportation space since the length of its leg frames is unadjustable.

BRIEF SUMMARY OF THE INVENTION

A main object of this present invention is to provide a simplified and cost saving foldable support frame for supporting a cutting machine, which can be easily folded for storage and transport and unfolded for supporting the cutting machine or other similar machines.

Another object of the present invention is to provide a foldable support frame, wherein the length of its leg frames can be adjusted to obtain a smaller storage and transport space.

To obtain the above objects, the present invention provides a foldable support frame. The foldable support frame comprises two opposing pairs of leg frames each of which comprises a pair of first and second crossed legs pivotally connected together at a crossing point of the first and second crossed legs, and two pairs of the combination of a first crossed leg and a second crossed leg are opposing. The foldable support frame further comprises a first connection means for supporting the two first crossed legs in a parallel manner, a second connection means for supporting the two second crossed legs in a parallel manner, a first support bar fixedly connected between two top ends of the two first crossed legs, a second support bar fixedly connected between two top ends of the two second crossed legs, and two opposing stopper means for supporting separately between each first and second crossed legs to limit the inclination of each of the first and second crossed legs. In this manner, the foldable support frame can be unfolded to form a rigid "X" structure while the top surfaces of the first and second support bars are within a horizontal plane to flatly support a cutting machine, or be folded up to an folded structure.

Each of the first and second crossed legs further comprises an upper slide rod and a support leg, and each upper slide rod can slide within a relevant support leg. The foldable support frame attaches its set-up height and width when the upper slide rods are put out furthest and the two leg frames are unfolded furthest.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
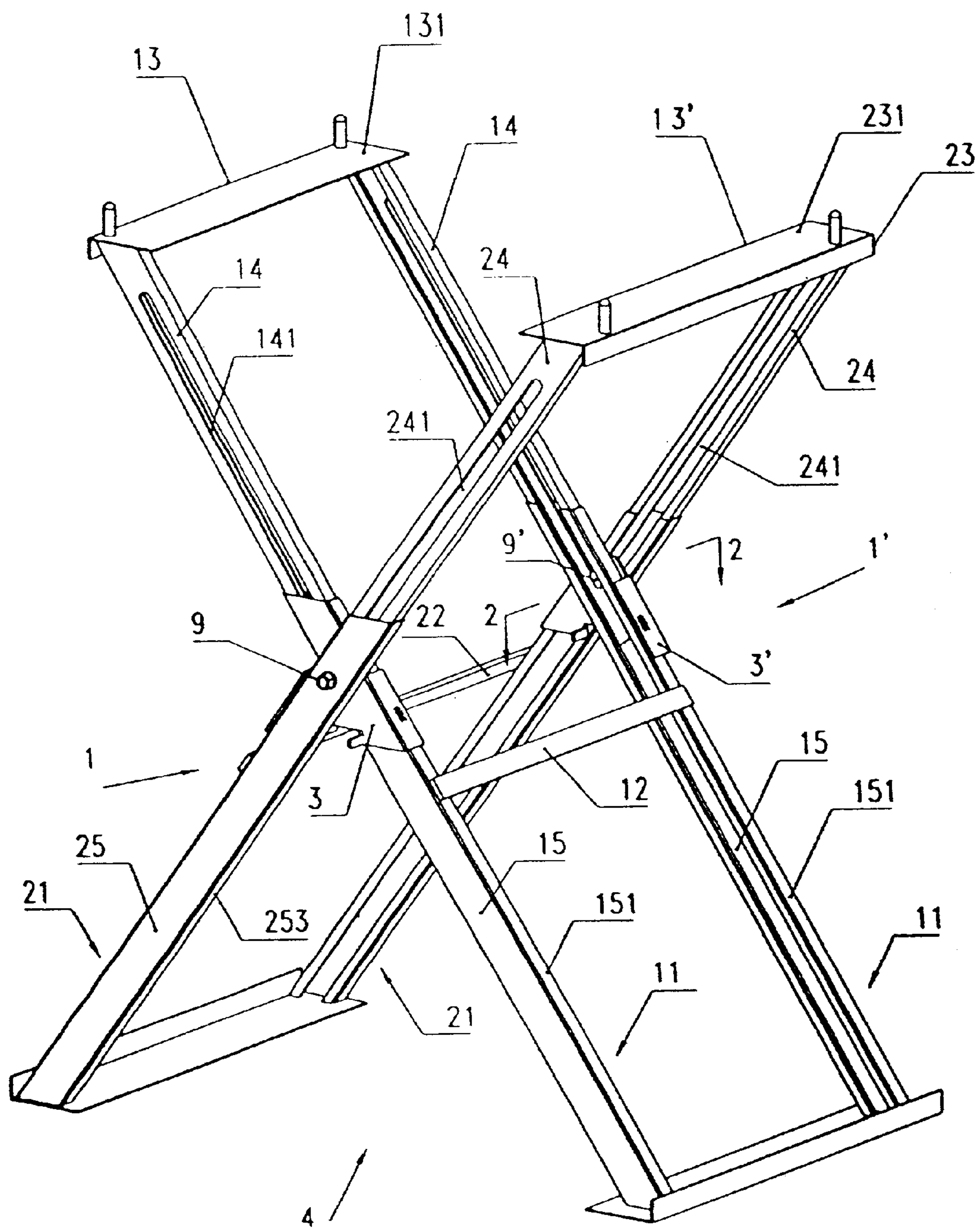
FIG. 1 is a perspective view of a foldable support frame for supporting cutting machine in an extended position.

Referring to the drawings, and to FIGS. 1–5 in particular, a foldable support frame 4 for supporting a cutting machine 5 according to the present invention comprises two opposing leg frames 1,1' each of which comprises a pair of first and second crossed legs 11,21 pivotally connected together by a connection means 71 at a crossing pivot point 9,9' where a pair of first and second crossed legs 11,21 cross. The foldable support frame 4 further comprises a first connection means 12 for supporting the two first crossed legs 11 in a parallel manner, a second connection means 22 for supporting the two second crossed legs 21 in a parallel manner, a first support bar 13 fixedly connected between two first top ends 16 of said two first crossed legs 11, a second support bar 13' fixedly connected between two second top ends 26 of the two second crossed legs 21, two opposing stopper means 3,3' separately mounted at their respective crossing point 9,9' for supporting each pair of first and second crossed legs 11,21.

Figure 3:
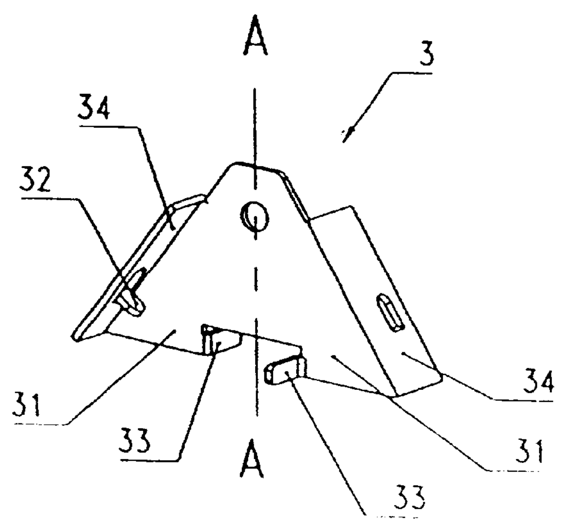
FIG. 3 is a perspective view of a stopper means.

FIG. 3 is a perspective view of the stopper means 3, it being understood that the stopper means 3' is mirror opposite with respect to the stopper means 3. Each stopper means 3,3' comprises two side flanges 34 which are angled with respect to each side of a half 31 of the stopper means 3,3' for limiting the inclination of each of the first and second crossed legs 11,21. The angle between the two side flanges 34 determines the largest angle between two pairs of the first and second crossed legs 11,21. Therefore, the two stopper means 3,3' make the foldable support frame 4 form a rigid "X" structure when the stopper means 3,3' stops the rotational movement of the first and second crossed legs 11,21 toward the extended position. The two top surfaces 131,231 of the first and second support bars 13, 13' are within a same horizontal plane to flatly support a cutting machine.

Referring to FIG. 1, each of the first and second connection means 12,22 can be a connection bar fixedly connected with the two first crossed legs 11 and the two second crossed legs 21.

Figure 2:
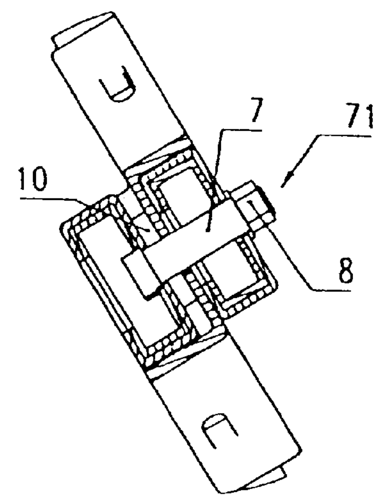
FIG. 2 is an enlarged partial sectional view taken along line 2—2 of FIG. 1 of a crossing structure at a crossing point.

Referring to FIGS. 1 and 2, each of the two connection means 71 comprises a headed stud 7 and a nut 8 to connect each first crossed leg 11 with a relevant second crossed leg 21 together and form a pivot point 9,9'. A washer 10 is located between each pair of first and second crossed legs 11,21 to reduce the friction during pivoting movement of the first and second crossed legs.

Figure 4:
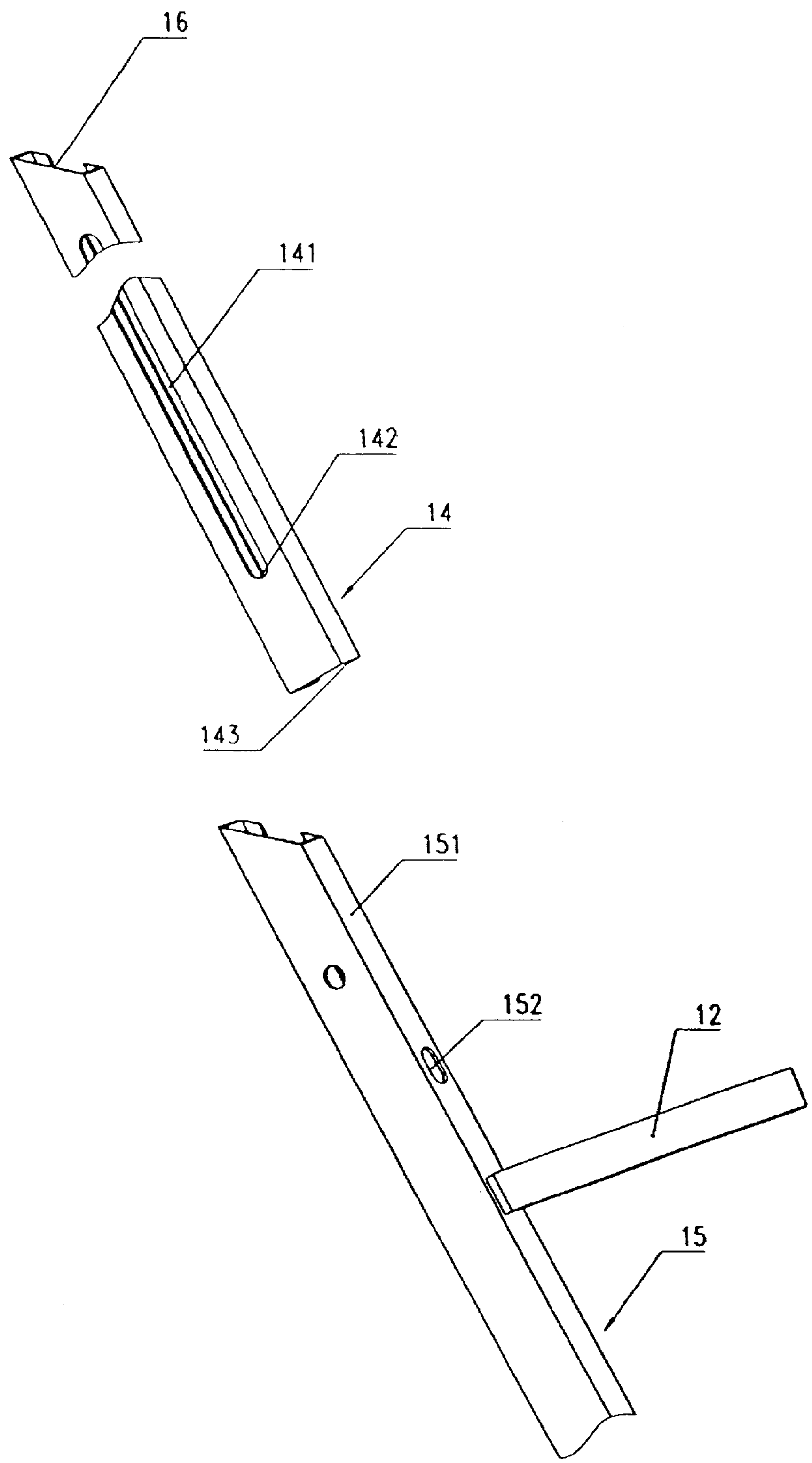
FIG. 4 is a perspective view of an upper slide rod and a support leg of a first crossed leg.
Figure 5:
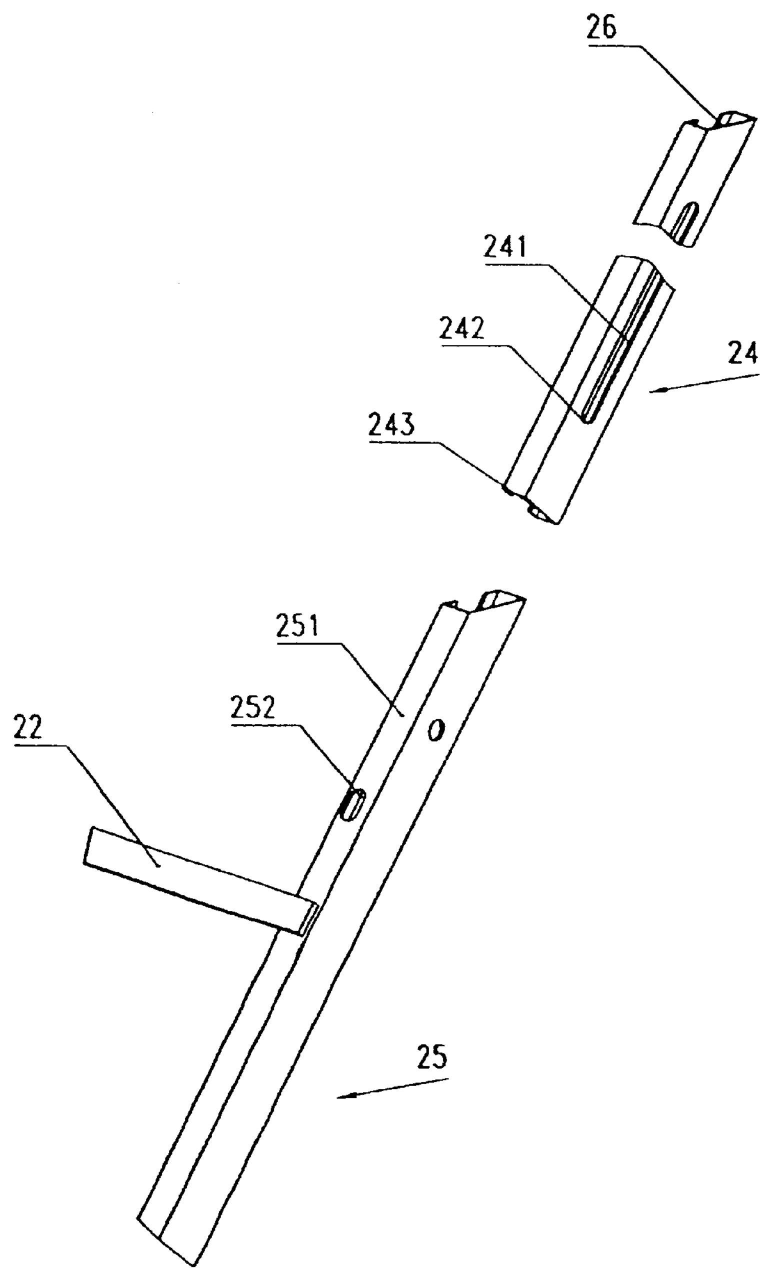
FIG. 5 is a perspective view of an upper slide rod and a support leg of a second crossed leg.

Referring to FIGS. 4 and 5, each of the first and second crossed legs 11,21 further comprises an upper slide rod 14,24 and a support leg 15,25. Each upper slide rod 14,24 can slide within a relevant support leg 15,25. A similar elongate slot 141,241 in each of the upper slides 14,24 ensures that the sliding movement of the upper slide rods is not impeded by the connection means 71.

Referring to FIGS. 1 and 3, the stopper means 3' is rotated 180 degrees about the axis A—A with respect to the stopper means 3. A support tab 32 is formed in each of the turned side flanges 34 of each stopper means 3,3'. As shown, the support tabs 32 extend generally downwardly from the side flanges 34.

Referring to FIGS. 4 and 5, a hole 152,252 is formed in an outer surface 151,251 of each support leg 15,25. A bottom end 143,243 of each upper slide rod 14,24 is just above its respective hole 152,252 when the upper slide rods 14,24 are extended. In this position, a lower portion 142,242 of each slot 141,241 is impeded by its respective connection means 71, and each of the support tabs 32 is inserted into the hole 152,252 of its respective support leg 15,25 to support the bottom end 143,243 of its respective upper slide rod to form a rigid "X" table support frame 4 when each of the first and second crossed legs 11,21 are unfolded and stopped by the relevant turned side flange 34.

Figure 6:
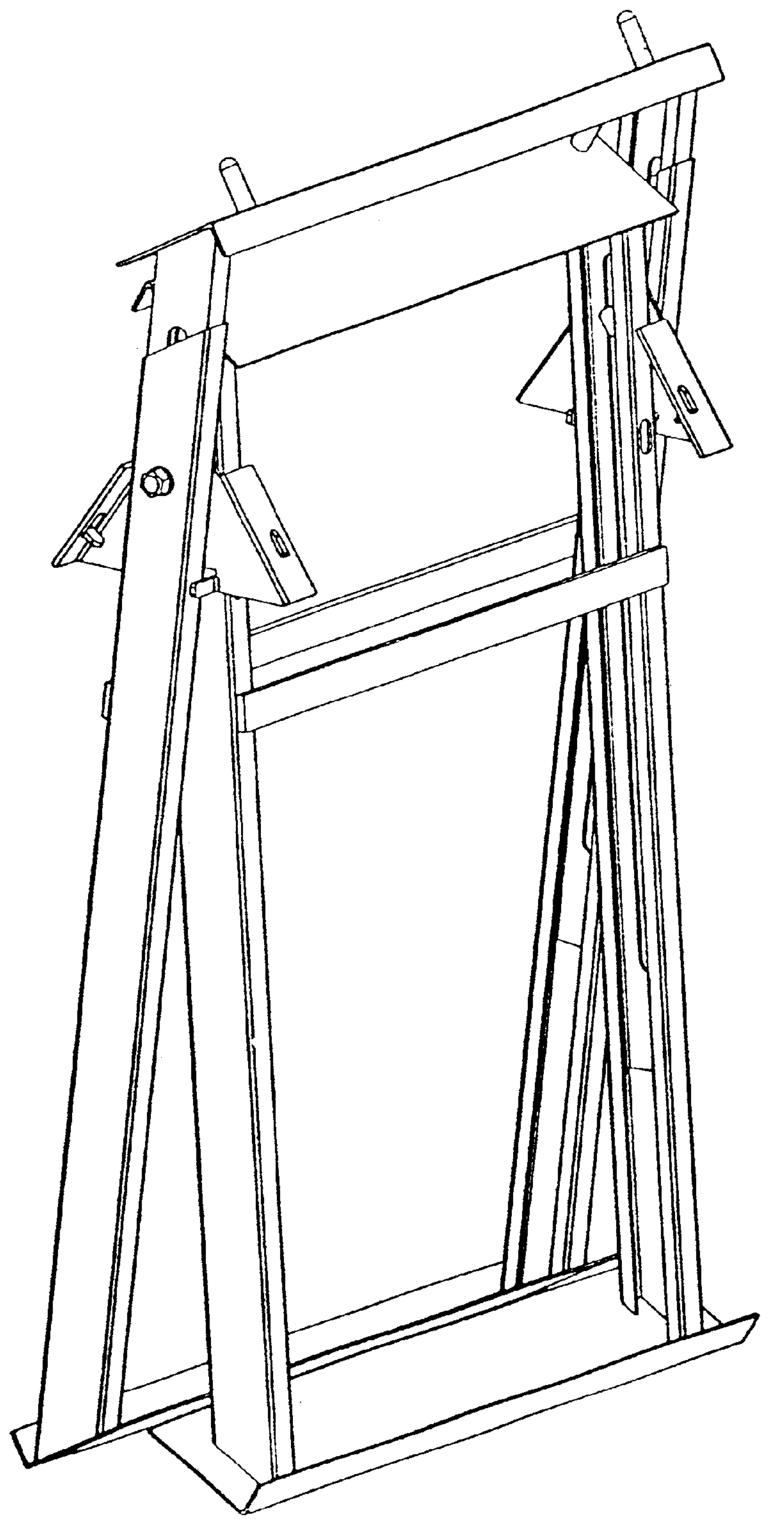
FIG. 6 is a perspective view of the foldable support frame in a retracted or folded position.
Figure 7:
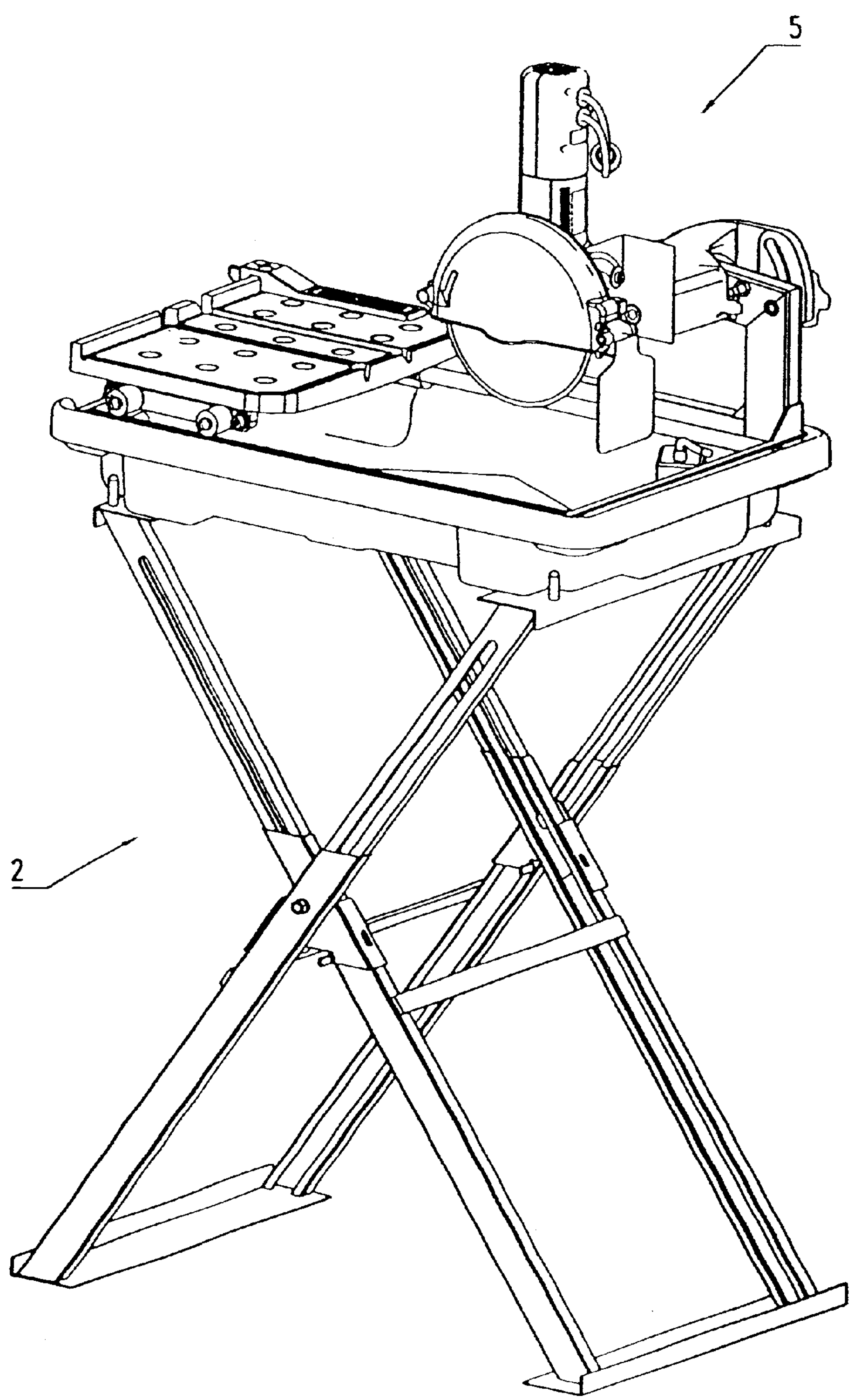
FIG. 7 is a perspective view of the foldable support frame supporting a cutting machine.

Referring to FIG. 3, each of the stopper means 3,3' further comprises two turned legs 33. Each leg 33 is pushed by a respective support leg 15,25 and each support tab 32 is withdrawn from each respective hole 152,252 when the leg frames 1,1' are being folded. The four upper slide rods 14,24 thus can be drawn back into their respective support legs 15,25 to fold the table supporting frame 4 and take up the least amount of space as shown in FIG. 6, and can be moved into the extended position for supporting a cutting machine or the like, as shown in FIG. 7.

Accordingly, the foldable support frame of the present invention meets the needs of simplification, portability, ease of use and cost savings.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A foldable support frame (4) for supporting a cutting machine, the support frame comprising:

two opposing pairs of leg frames (1,1') each of which comprises a pair of first and second crossed legs (11,21) pivotally connected together by a connection means (71) and forming a cross pivot point (9,9') where said first and second crossed legs (11,21) cross, and each first and second crossed leg (11, 21) comprises an upper slide rod (14,24) and a support leg (15,25), an elongate slot (141,241) in each said upper slide rod (14,24);

a first connection means (12) for supporting said two first crossed legs (11) in parallel manner;

a second connection means (22) for supporting said two second crossed legs (21) in parallel manner;

a first support bar (13) fixedly connected between two top ends (16) of said two first crossed legs (11);

a second support bar (23) fixedly connected between top ends (26) of said second crossed legs (21); and two opposing stopper means (3,3') separately mounted respective crossing points (9,9'), wherein each stopper means (3,3') comprises two side flanges (34) which extend in opposite directions limiting inclination of each of said first and second crossed legs (11,21), a support tab (32) extending from each side flange (34); a hole (152,252) on an outer surface (151,251) of each said support leg (15,25), each of said support tabs (32) being inserted into a respective hole (152,252) to support a bottom end (143,243) of a respective upper slide rod (14,24) when said upper slide rods (14,24) are extended until a lower portion (142,242) of each slot (141,241) is impeded by its respective connection means (71) with said first and second crossed legs (11,21) being unfolded and stopped by said side flanges (34).

2. The foldable support frame (4) of claim 1, wherein each said first and second connection means (12,22) is a connection bar.

3. The foldable support frame (4) of claim 1, wherein each connection means (71) comprises a headed stud (7) and a nut (8), said upper slide rods (14,24) being impeded from sliding movement within their respective support legs (15,25) when the nuts (8) are screwed tightly on their respective headed studs.

4. The foldable support frame (4) of claim 3, wherein each said stopper means (3,3') comprising two turned legs (33), each said turned leg (33) being pushed by a respective support leg (15,25) and each support tab (32) being withdrawn from its respective hole (152,252) when said leg frames (1,1') are being folded, to thereby retract the upper slide rods (14,24) into their respective support legs (15,25).

5. The foldable support frame (4) of claim 1, wherein each said stopper means (3,3') comprises two turned legs (33), each said turned leg (33) is pushed by a respective support leg (15,25) and each support tab (32) being withdrawn from its respective hole (152,252) when said leg frames (1,1') are being folded, to thereby retract the upper slide rods (14,24) into their respective support legs (15,25).

* * * * *